(No Model.)
I. L. SMITH.
BABY CARRIAGE.
No. 350,162. Patented Oct. 5, 1886.
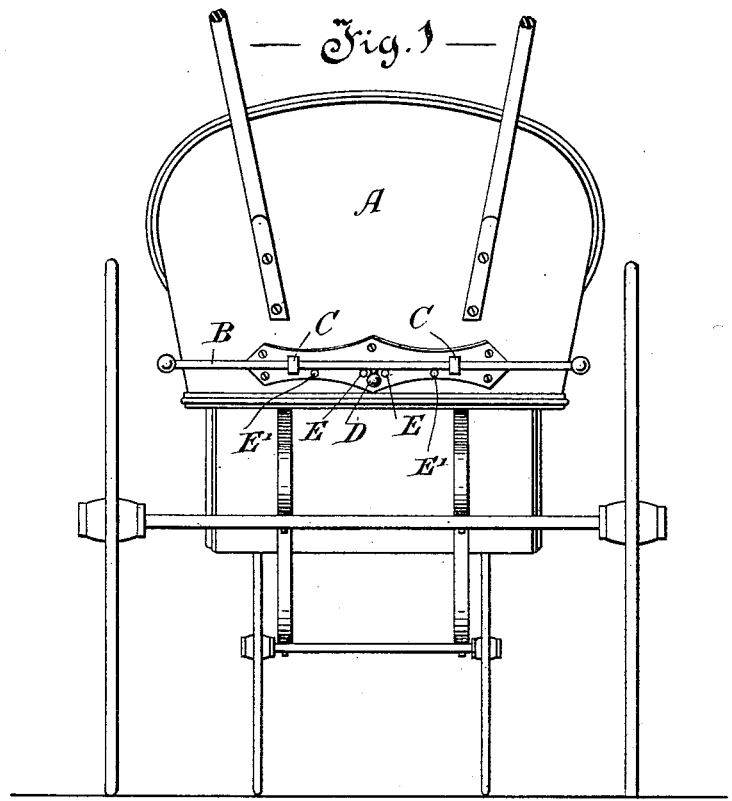
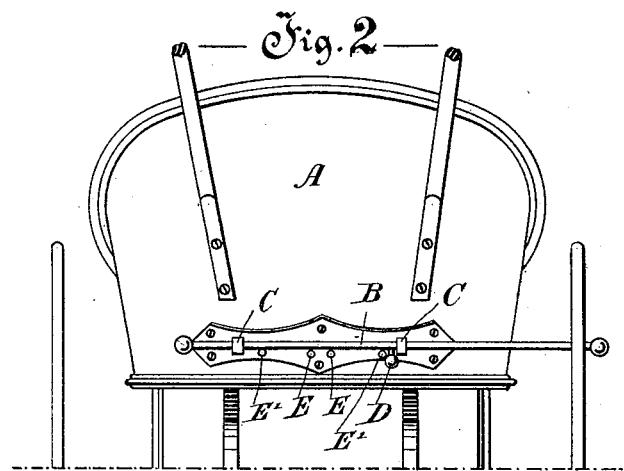
Witnesses:
Owen M. Evans
Alex. M. Dow
Inventor
Irving Leander Smith
Per Attys:

UNITED STATES PATENT OFFICE.

IRVING LEANDER SMITH, OF MONTREAL, QUEBEC, CANADA.

BABY-CARRIAGE.

SPECIFICATION forming part of Letters Patent No. 350,162, dated October 5, 1886.

Application filed July 10, 1886. Serial No. 207,616. (No model.)

*To all whom it may concern:*

Be it known that I, IRVING LEANDER SMITH, of the city of Montreal, in the district of Montreal and Province of Quebec, Canada, have invented certain new and useful Improvements in Baby-Carriages; and I do hereby declare that the following is a full, clear, and exact description of the same.

My invention, although specially applicable to baby-carriages of the usual type, may be used with great advantage in any kind of a hand-cart not provided with a heavy handle or stand, and may be described as consisting, in the addition to such vehicles, of means by which they are prevented from moving from any place in which they may be left. To effect this I lock the hind wheel on either side by means of a sliding bar secured about the level of the bottom of the carriage in rings or eyes, through which it can run freely in either direction, so as to pass through the wheel on that side, stops being provided to lock it in the desired position.

For full comprehension of the invention reference must be had to the annexed drawings, in which—

Figure 1 is a back view of a baby-carriage provided with my invention, and Fig. 2 a similar view showing the wheel locked.

Similar letters of reference indicate like parts.

A is the carriage itself, of any usual or desired construction, B being the sliding bar carried in rings C C, secured to the back or under side of the carriage.

D is a handle forming part of the bar B, or attached to it, lying usually between stops E E; but when the bar B is pushed in either direction so as to pass through the wheel and lock it this handle is dropped down, so as to lie against either of the stops E' E', so as to prevent the bar from sliding back and releasing the wheel. The length of the throw of the bar B will be determined by the distance between the stops E and E'.

It must be understood that my invention may be arranged to act equally well upon the fore wheels of a baby-carriage, and in fact will be so placed when applied to vehicles which are pulled instead of being propelled by pushing. Brackets with sockets in them may be substituted for the rings C to hold the bar.

Having thus described my invention, I beg to state that what I claim is as follows:

The combination, with a baby-carriage or like vehicle, of a sliding bar carried in rings, eyes, or brackets secured to the carriage and having a handle projecting therefrom, and stops, all as herein set forth, and for the purposes described.

IRVING LEANDER SMITH.

Witnesses:
OWEN M. EVANS,
ALEX. W. DOW.